United States Patent Office 2,842,514
Patented July 8, 1958

2,842,514

RESIN COMPOSITIONS CONTAINING ESTERS OF POLYHYDRIC ALCOHOLS AS PLASTICIZERS FOR THE RESIN

Jeffrey H. Bartlett and Paul V. Smith, Jr., Westfield, N. J., assignors to Esso Research and Engineering Company, a corporation of Delaware No Drawing. Application September 24, 1954
Serial No. 458,259

8 Claims. (Cl. 260—31.6)

This invention relates to a new class of esters which have been discovered to be particularly effective as plasticizers for resins and rubber-like materials. In particular, this invention relates to esters of certain polyhydric alcohols and $C_5$ to $C_7$ aliphatic acids.

The ever expanding us of plastic materials such as vinyl chloride polymers or copolymers, polyvinyl acetate, cellulose esters, acrylate and methacrylate resins, rubbers such as the emulsion copolymers of butadiene with styrene or acrylonitrile, or the coplymers of isobutylene with small amounts of a diolefin such as isoprene have created a large demand for suitable plasticizers. Alkyl esters and particularly di-2-ethylhexyl phthalate, di-iso-octyl phthalate, di-n-octyl phthalate, tri-iso-octyl phosphate, and tri-2-ethylhexyl phosphate have been known to be satisfactory plasticizers for the aforementioned high molecular weight materials, but esters derived from dihydric or polyhydric alcohols have found relatively little application due to lack of thermal stability, compatibility and/or poor volatility characteristics.

It is the object of this invention to provide the art with a new source of esters derived from polyhydric alcohols and monobasic acids. Another object is the production of plastic compositions having superior physical and chemical properties. Still other objects will appear from the subsequent description.

It has now been discovered that new alkyl esters of monobasic acids can be prepared from certain novel polyhydric aliphatic alcohol mixtures, and it has been discovered further that these alcohol mixtures give esters unexpectedly superior to comparable esters previously known as plasticizers for vinyl resins.

The properties of a plasticizer which are most important are high plasticizing efficiency and low volatility. Usually, when changes are made to improve one of these properties, the other is adversely affected. For example, an increase in alcohol molecular weight tends to reduce volatility at the expense of plasticizing efficiency. However, the esters of this invention shown the unexpected properties of both low volatility and increased flexibility at low temperatures, particularly after aging.

The alcohol mixtures required for the present invention are obtained by the reaction of aldehydes obtained by the "Oxo" process with formaldehyde in the presence of an alcoholate or other alkali. The "Oxo" process by which the aldehydes are formed, is understood in the art as referring to a process wherein an olefin feed is reacted or "oxonated" with carbon monoxide and hydrogen at a temperature between 250° and 400° F. and under a pressure of about 150 to 400 atmospheres in the presence of a cobalt catalyst in accordance with the following reaction:

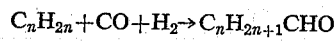

In discussing the "Oxo" reaction of olefin hydrocarbons, it has been found convenient to classify the various olefins into five fundamental types according to the character of carbon atoms linked by the olefinic bonds. These five types are as follows:

Type I    $CH_2=CHR$

Type II    $RCH=CHR$

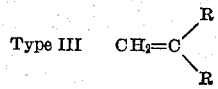

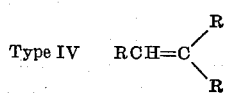

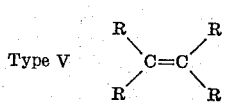

In the above formulas, R represents a straight or a branched chain alkyl group, it being understood that where more than one symbol R appears in a formula, the several R symbols may represents the same alkyl group or different alkyl groups. Under this classification, for example, butene-1, 3-ethyl pentene-1, or 4,4-dimethyl pentene-1 are type I olefins; butene-2, 4,4-dimethyl-pentene-2, 2-methyl 5-ethyl hexene-3 are type II olefins; 2,3,3-trimethyl butene-1 is a type III olefin; 2,4-dimethyl pentene-2 is a type IV olefin; tetramethyl ethylene is a type V olefin; and so forth.

In the "Oxo" reactions, generally, there is no invariable point of attack on the olefinic double bond such as one might predict from Markownikoff's rule, and thus in the case of type I olefins of the formula

approximately equal amounts of both

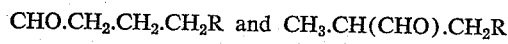

are formed, with the 1-position being slightly favored. It is thus apparent that the "Oxo" process is inherently committed to the production of at least some branched-chain aldehydes even when the starting material is a pure type I straight-chain olefin. Type V olefins are usually incapable of oxonation. The oxonation feed may contain monoolefins of any type and suitable olefinic feeds may be fractionated, for example, from cracked gases, from Fischer-Tropsch synthesis products or from a polymerized stream of $C_3$ to $C_5$ olefins.

Particularly effective plasticizers can be prepared according to this invention from aldehydes derived from a carefully fractionated $C_7$ cut. Such a $C_7$ cut can best be obtained by copolymerization of propylene and n-butenes.

The aldehydes formed by oxonation of the olefinic materials described above are naturally quite complex in character and the exact composition of many of these products is not known. The $C_8$ "Oxo" aldehydes obtained from the $C_7$ cut have been found to comprise a mixture of isomers having, on the average, one or two carbon atoms attached to a principal paraffinic chain of six or seven carbon atoms. In other words, the mixture of $C_8$ aldehydes useful for the purpose of the present invention consists essentially of isomers having the formula

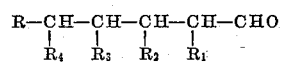

wherein R stands for methyl or ethyl and $R_1$, $R_2$, $R_3$ and $R_4$ stand for hydrogen or methyl groups, and wherein $R_1$ plus $R_2$ plus $R_3$ plus $R_4$ contain up to 2 carbon atoms.

The $C_8$ aldehydes thus obtained are reacted with formaldehyde in the presence of an alkali such as caustic, lime, an alkali metal alcoholate or the like. The reaction with the formaldehyde proceeds in accordance with processes known in the art. Since the aldehyde mixture is complex, the resulting polyhydric alcohol mixture will be just as complex.

The polyhydric alcohols thus prepared are then esterified with $C_5$–$C_7$ saturated aliphatic acids, e. g. valeric, caproic and heptanoic acids. The butyric ester is too volatile and the esters above $C_7$ are too incompatible with the resin. These esters can be prepared by any of the conventional methods, as by reacting the alcohol with acid, or with acid anhydride, or with acid chloride, or by first transforming the alcohol into an alkyl halide and then reacting the latter with a metal salt of the selected acid. The invention does not rest in the process of making the new esters, but rather in the esters themselves as plasticizers which, due to the particular choice of polyhydric alcohols used in their preparation, possess a superior and unexpected combination of properties. As described above, where particularly pure and colorless esters having good plasticizing action at low temperatures are desired, it is important first to subject the crude "Oxo" aldehyde to a distillation at pot temperatures preferably not exceeding about 240° C. The larger the aldehyde distillate recovery on distillation of a given crude "Oxo" aldehyde, the poorer the quality of the ester product prepared therefrom, and for best results the aldehyde cut should correspond to a yield of about 50 to 70% based on the aldehyde in the crude product.

The advantages of the invention will be better understood from a consideration of the following experimental data which are given for the sake of illustration, but without intention of limiting the invention thereto.

EXAMPLE I

To 1 mole of $C_8$ aldehyde and 4 moles of para-formaldehyde in dioxane or methyl alcohol was added 1 mole of $NaOCH_3$ at room temperature over the course of two hours. The reaction was continued for another 2 hours. Then the product, after water washing and drying, was stripped to give a bottoms sample having a hydroxyl value of 1.15 centiequiv./g. A subsequent analysis by distillation showed this polyalcohol product to be a mixture having the following characteristics:

| Boiling Range, ° C. | Pressure, mm. | Weight percent | Hydroxyl centiequiv./g. |
| --- | --- | --- | --- |
| 117–140 | 0.65 | 28.5 | 1.156 |
| 140–145 | 0.65 | 51.5 | 1.319 |
| Bottoms | | 20.0 | 0.801 |

By conventional esterification procedures this alcohol product was then reacted with saturated monobasic acids to give the novel ester plasticizers described herein.

EXAMPLE II

The effectiveness of the novel esters of this invention as plasticizers is shown in the runs evaluated in Table I wherein a commercial polyvinyl chloride resin known as Geon 101 was chosen as the illustrative material. In preparing the test samples, 100 grams of the resin were dry-blended by hand with 3 grams of sodium organophosphate and 1.5 grams of dibasic lead stearate. Instead of the sodium organophosphate, 1 to 5 parts per 100 parts of resin of other resin stabilizers could be used. The dry mixture was heated in a beaker with 50 grams of the plasticizer and stirred to give a homogeneous blend whereupon the latter was charged to a 6 x 12 inch laboratory mill heated with steam to about 280 to 320° F. The resin was then fluxed about two minutes and allowed to mill with a rolling bank for five minutes with occasional cutting. Qualitative tests indicated that different combinations of vinyl resins and plasticizer required somewhat different mill temperatures to obtain a good mix in five minutes. After mill mixing, the stock was sheeted off at 0.075 to 0.15 inch thickness.

In general, it was observed that the novel esters flux or solvate high molecular weight vinyl resins at the usual milling temperatures noticeably faster than similar esters previously known. This is a very important factor since it has long been recognized that prolonged exposure of a vinyl resin stock to heat during processing or later has a permanent adverse effect on the stability and physical properties of such a stock. The improved fluxing properties of the novel plasticizers thus have a direct beneficial effect on the properties of the plasticized resin in that these plasticizers make it possible to reduce the total high temperature history of the resin stock.

The sheeted stock was then molded at 280° F. in a standard A. S. T. M. mold (D16–41) yielding slabs 6 x 6 x 0.075 inch. The molding cycle was 10 minutes at minimum ram pressure to allow free flow of the resin, followed by 10 minutes at 900 lbs./sq. in. The molded slabs were allowed to stand near 75° F. for at least one day before testing.

Tensile properties were determined in the usual manner on a Scott tester (Model L–3) at about 75° F. and 50% relative humidity, the rate of jaw separation being 20 inches per minute. Heat aging characteristics were measured in a hot air circulating oven designed to give reproducible results. The specimens tested were cut from molded slabs with die C (A. S. T. M. D412–41).

The dynamic modulus was determined by measuring the force developed in a plasticized vinyl film under conditions of 10% static deformation and 0.7% oscillatory deformation at 15 cycles per second. Values are expressed in p. s. i.×10⁻⁴.

The results are summarized in Table I.

*Table I.—Esters of polyhydric alcohol mixture as vinyl plasticizers*

| Ester | Di-octyl phthalate | Esters of Polyhydric Alcohol Mixture | | | | |
|---|---|---|---|---|---|---|
| | | Butyric | Caproic | $C_8$ Oxo Acid | $C_{10}$ Oxo Acid | $C_{13}$ Oxo Acid |
| Original properties: | | | | | | |
| Tensile, lbs./sq. in. | 3,000 | 3,085 | 2,920 | Formed a weak film with Geon 101. Too poor for evaluation. | Incompatible. | Incompatible. |
| Modulus, 100 percent | 2,000 | 2,040 | 1,880 | | | |
| Elongation, percent | 295 | 305 | 305 | | | |
| Aged 4 Days @ 100° C.: | | | | | | |
| Tensile | 2,870 | 2,430 | 2,900 | | do | Do. |
| Modulus | 2,000 | 2,365 | 2,130 | | do | Do. |
| Elongation | 265 | 155 | 305 | | do | Do. |
| Percent Ten.—Elong. Retained | 95–90 | 79–51 | 99–100 | | do | Do. |
| Aged 7 Days @ 100° C.: | | | | | | |
| Tensile | 2,660 | 2,440 | 3,060 | | do | Do. |
| Modulus | 2,100 | 2,440 | 2,265 | | do | Do. |
| Elongation | 225 | 140 | 295 | | do | Do. |
| Percent Ten.—Elong. Retained | 89–76 | 79–46 | 104–97 | | do | Do. |
| Volatility @ 100° C.: | | | | | | |
| Percent Plasticizers Loss— | | | | | | |
| 4 Days | 11 | 35 | 14 | | do | Do. |
| 7 Days | 20 | 46 | 20 | | do | Do. |
| Primol D Extraction @ 52° C.: | | | | | | |
| Percent Plasticizer Loss— | | | | | | |
| 4 Days | 7.2 | 6.1 | 9.6 | | do | Do. |
| 7 Days | 9.2 | 8.4 | 12.4 | | do | Do. |
| Dynamic Modulus ×10⁻⁴: | | | | | | |
| +25° C | 1.26 | 1.65 | 1.65 | | do | Do. |
| +10° C | 4.4 | 5.9 | 4.6 | | do | Do. |
| −5° C | 13.9 | 16.8 | 10.9 | | do | Do. |
| −20° C | 23.3 | 28.6 | 20.5 | | do | Do. |

Formulation: Parts
Geon 101 _____ 100
Plasticizer _____ 50
Vanstay [1] _____ 3
DS-207 [2] _____ 1.5

[1] Sodium organophosphate.
[2] Dibasic lead stearate.

An important advantage of the particular esters of this invention is apparent from the data on the retention of tensile and elongation after aging. The results indicate that the caproic ester is outstandingly superior to dioctyl phthalate with respect to these important properties. The use of esters of this invention leads to vinyl compounds of great thermal stability which retain their strength and flexibility on aging.

In summary, the invention relates to novel esters of polyhydric alcohols and $C_5$–$C_7$ aliphatic acids, wherein the aliphatic polyhydric alcohols used in the esterification reaction are prepared from "Oxo" aldehydes by reaction with formaldehyde in the presence of an alkali.

In particular, the invention relates to plasticized resin compositions containing the novel esters as plasticizers, usually in proportions ranging from about 5 to 100 parts or preferably 30 to 60 parts per 100 parts of resin. Polymeric materials which lend themselves to successful plasticization with the esters of the invention include the various vinyl resins such as polyvinyl chloride, polyvinyl acetate, copolymers of vinyl chloride and vinyl acetate, polyvinyl alcohol, mixed polymers of vinyl chloride with vinyl acetate, or vinylidine chloride, polyvinyl butyral or other polyvinyl acetals; nitrocellulose, ethyl cellulose; rubber-like polymers of diolefinic materials such as butadiene-nitrile (GR–A), butadiene-styrene (GR–S) or polychloroprene elastomers, or isobutylene-diolefin copolymers of the GR–I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile content. It will be understood, of course, that in addition to the plasticizer, the polymer compositions may also contain conventional stabilizers such as basic lead carbonate, sodium borate or the like, oleic acid, auxiliary plasticizers or softeners, fillers, pigments and eventually also curing agents, when the polymer is of the curable type.

It will be understood further that the foregoing examples have been given merely for purposes of illustration, but that other modifications of the present invention are possible without departing from the scope of the appended claims.

The nature of the present invention having been thus fully set forth and specific examples of the same given, what is claimed as new and useful and desired to be secured by Letters Patent is:

1. A plastic composition of matter comprising a polyvinyl resin and, as a plasticizer therefor, an ester of a $C_5$ to $C_7$ saturated aliphatic acid and a mixture of polyhydric alcohols prepared by reacting over a period of about 4 to 10 hours at about room temperature about 4 moles of alkaline formaldehyde with about 1 mole of $C_8$ aldehydes, the resultant reaction product being water washed, dried and stripped, and having a hydroxyl value of about 1.15 centiequivalents per gram, the $C_8$ aldehydes consisting essentially of a mixture of isomers having the formula R—$CHR_4$—$CHR_3$—$CHR_2$—$CHR_1$—CHO wherein R is selected from the group consisting of $CH_3$ and $C_2H_5$; $R_1$, $R_2$, $R_3$ and $R_4$ are selected from the group consisting of H and $CH_3$; and wherein $R_1$ plus $R_2$ plus $R_3$ plus $R_4$ contain up to 2 carbon atoms, the $C_8$ aldehydes being obtained by the catalytic oxonation of a mixture of $C_7$ olefins at a temperature between 250° and 400° F. and pressures between 150 and 400 atmospheres.

2. A composition according to claim 1 wherein the resin is a polymer of vinyl chloride.

3. A composition according to claim 1 comprising 100 parts of a resinous polymer of vinyl chloride and 30 to 60 parts of said ester.

4. A composition according to claim 3 wherein said ester is a neutral ester of caproic acid.

5. A composition according to claim 3 wherein said ester is a neutral ester of valeric acid.

6. A composition according to claim 3 wherein said ester is a neutral ester of heptanoic acid.

7. A plastic composition of matter comprising a polyvinyl resin and a plasticizer therefor consisting of an ester of a $C_5$ to $C_7$ saturated aliphatic acid and a mixture of aliphatic polyhydric alcohols, having a hydroxyl value of about 1.15 to 1.32, said alcohols being prepared by reacting formaldehyde with $C_8$ aliphatic aldehydes for about 4 to 10 hours at about room temperature.

8. A composition according to claim 7 wherein the mixture of polyhydric alcohols boils between about 117 and 145° C. at 0.65 mm. absolute pressure.

References Cited in the file of this patent

UNITED STATES PATENTS 2,545,811    Hetzel _____ Mar. 20, 1951
2,738,370    Staib et al. _____ Mar. 13, 1956